April 17, 1928.

A. W. WEEDEN

ROTARY MOTOR OR PUMP

Filed Feb. 16, 1927

1,666,321

Inventor.
Arthur W. Weeden
by Heard Smith & Tennant
Attys

Patented Apr. 17, 1928.

1,666,321

UNITED STATES PATENT OFFICE.

ARTHUR W. WEEDEN, OF QUINCY, MASSACHUSETTS, ASSIGNOR OF THREE-FIFTHS TO ELLA MAY FREEMAN, OF QUINCY, MASSACHUSETTS.

ROTARY MOTOR OR PUMP.

Application filed February 16, 1927. Serial No. 168,523.

This invention relates to an apparatus which may function either as a rotary motor or as a rotary pump and one of the principal objects of the invention is to provide a novel device of this type which is simple in its construction but effective in operation. The device comprises two or more rotors which are rotatably mounted in a suitable casing and each of which is provided on its periphery with gear teeth meshing with gear teeth on the other rotor, said intermeshing gear teeth causing the rotors to rotate always synchronously. Each rotor has a plurality of blades extending radially from its periphery beyond the gear teeth and also is provided with pockets or recesses to receive the blades of the other rotor as the device operates. When the device is used as a motor the pressure of the motive fluid against the blades furnishes the motive power. The gear teeth tie the rotors together so that they are in proper timed relation to each other. When used as a pump the co-operative action of the blades and the walls of the chambers in which the rotors operate serve to force the fluid from the inlet to the outlet and the length of the blades and consequently the amount of space between the gear teeth and the walls of the chambers determine the capacity of the pump.

In order to give an understanding of the invention I have illustrated in the drawings some selected embodiments thereof which will now be described after which the novel features will be pointed out in the appended claims.

Figure 1:
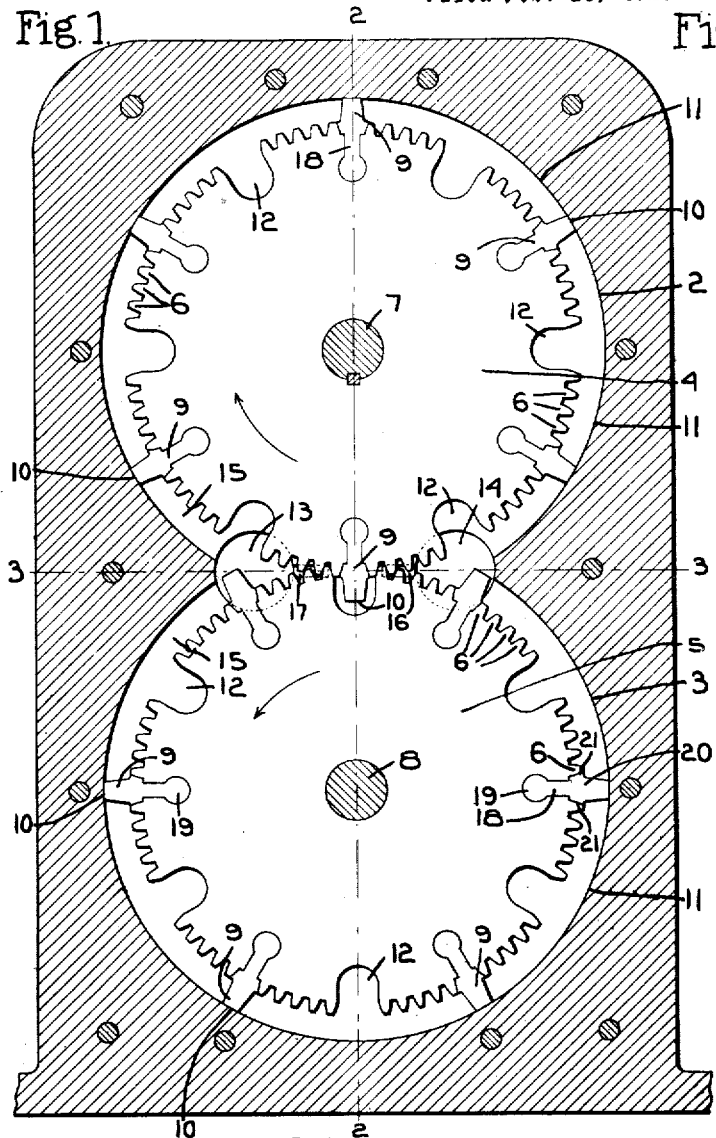
Fig. 1 is a vertical section through a device embodying my invention taken on substantially the line 1—1, Fig. 2.
Figure 2:
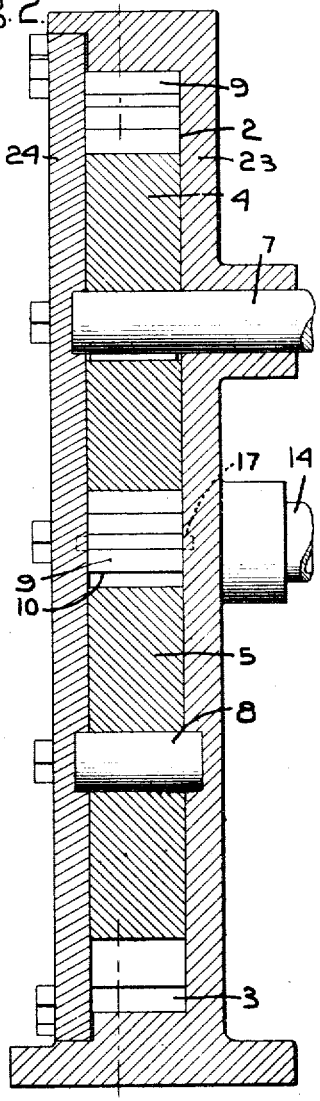
Fig. 2 is a section taken on the line 2—2, Fig. 1.
Figure 3:
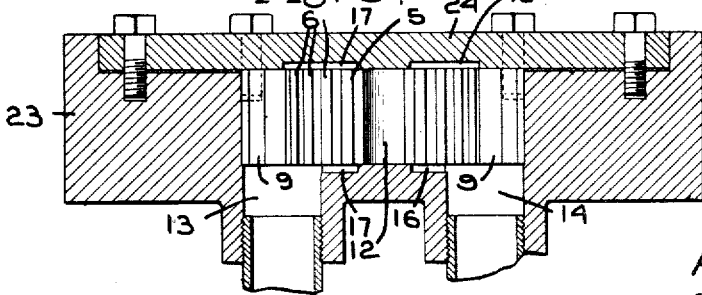
Fig. 3 is a section taken on the line 3—3, Fig. 1.

The device comprises a casing 1 having a plurality of circular chambers in which are received rotors. In the device illustrated in the drawing two such circular chambers are shown and are indicated at 2 and 3 respectively, said chambers communicating with each other. The rotors which are mounted in said chambers are indicated at 4 and 5. Each rotor has on its periphery gear teeth 6 which intermesh with corresponding gear teeth formed on the other rotor. One of the rotors (the rotor 4 in the present embodiment) is fast on a shaft 7 and the rotor 5 is mounted on a stud 8 which is journalled in the casing. When used as a motor the shaft 7 is that from which power is taken and when used as a pump the shaft 7 is that by which the pump is driven.

Each rotor also has extending radially from its periphery a plurality of blades 9, the outer edges 10 of which meet and engage the wall 11 of the chamber in which the rotor is received. The construction is such that each blade will make a tight joint with the wall of the chamber. It will be understood, of course, that the rotors are of a thickness equal to the depth of the chambers 2 so that the sides of each rotor fit closely against the walls of its chamber. Each rotor is also provided with a plurality of recesses 12 which are situated so as to receive the blades 9 of the other rotor as the rotors rotate.

The casing is provided with two ports 13 and 14, one of which is an inlet port and the other of which is a discharge port. These ports are located at the point where the walls of the two chambers meet so that each port communicates with both chambers 2 and 3.

Assuming that the device is to be used as a motor and that the port 13 is the inlet port and the port 14 the outlet port it will be seen that as fluid under pressure is introduced into the port 13 it will impinge against one blade 9 of each rotor and by the pressure of the motive fluid against said blades the rotors will be rotated, the upper rotor in a clockwise direction Fig. 1 and the lower rotor in an anti-clockwise direction. As the rotors rotate the motive fluid will be trapped between the blades and will be carried around by the blades to the discharge port 14 through which it will be discharged. In the operation of the device the blades 9 function merely to provide the surface against which the motive fluid acts while the gear teeth 6 ensure that the rotors will always rotate synchronously. The device is adapted to be used with any motive fluid whether compressed gaseous fluid or a liquid under pressure.

When the device is used as a pump power will be applied to the shaft 7, thus positively rotating the rotor 4. The rotor 5 will be rotated synchronously therewith through the action of the intermeshing gear teeth 6. As the rotors rotate the fluid being pumped will enter the inlet 13 and fill the space between the gear teeth and the walls of the chambers and as the rotation continues such liquid will be trapped in the space between the blades and will be carried around by the rotors to the discharge port 14 through which it will be discharged.

This construction provides a pump of relatively large capacity because at each rotation of the rotors a volume of fluid will be transferred from the inlet to the outlet equal to the combined volume of the spaces 15. This capacity may be increased, of course, by using longer blades. When operated as a pump the gears 6 serve as a means for synchronizing the rotating movement of the two rotors and they also serve as a means for cutting off the direct communication between the inlet and the outlet.

The casing is shown as having a groove 16 which communicates with the discharge 14 and extends toward the inlet in a direction tangential to the rotors. The purpose of this groove is to allow the escape of the fluid which fills the space between the gears as the gears are coming into mesh with each other thereby eliminating any back pressure at this point.

I have shown the casing as provided with a second groove 17 similar to the groove 16 but communicating with the port 13. When the rotors are rotating in the direction indicated by the arrows the groove 17 prevents the formation of vacuum pockets between the teeth as they separate from each other. The groove 16 thus allows the escape of fluid from between the teeth as they mesh while the groove 17 allows the fluid to freely fill the space between the teeth as they move out of mesh.

While I have above referred to the port 13 as the inlet port and the port 14 as the discharge port yet the device may be operated in the reverse direction either as a motor or as a pump by making the port 14 the inlet port and the port 13 the discharge port.

The efficiency of the device either as a pump or as a motor depends upon the tightness of the fit between the ends of the blades and the walls 11 of the chambers and in order to provide for maintaining a tight fit at this point I propose to make the blades so that the end portion at least thereof may be renewable. This can be done either by providing for renewing the blades as a whole or by making the blades with detachable end portions. In the construction shown in Fig. 1 each blade 9 is detachably secured to the rotor so that it can be readily removed therefrom and then can be replaced by another blade.

Each blade is shown as having a stem portion 18 provided with an enlarged end 19 and each rotor is formed with a groove or recess extending transversely therethrough of a shape to receive the stem with its enlarged end. The blades with their stems 18 extend the full width of the rotor from one face to the other and any blade may be removed by driving it edgewise out of its recess in the rotor. As shown in Fig. 1 each blade takes the place of one of the gear teeth 6 and in order to make a substantial structure I have formed each blade with the widened body portion 20 which has the inclined walls 21 that rest against the sides of the two gear teeth 6 that are adjacent the blade. With this construction each blade is well braced and firmly retained in position and will, therefore, give good service. A further advantage gained by having each blade of a size to take the place of a single tooth gear 6 is that a plurality of the gear teeth will be in mesh in all positions of the rotors. The recesses 12 are of such dimensions that the blades 10 are spaced from the walls of the recess as shown in Fig. 1. The gear teeth 6 constitute the sole driving connection between the rotors and by having each blade occupy the space of a single gear tooth only it is possible to have several gear teeth in mesh while a blade of one rotor is passing through the pocket of the other rotor. There is thus always a positive driving connection between the gear teeth 6 and the blades 9 are relieved of any strain due to driving operations.

Figures 4, 5:
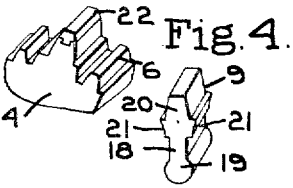
Fig. 4 shows one of the blades detached from the rotor.
Fig. 5 shows a modification of the invention.

In Fig. 4 I have shown one of the blades removed from the rotor.

Fig. 5 illustrates a different embodiment of the invention wherein each blade is provided with a removable tip 22 so that when the end of the blade becomes worn the worn tip portion can be removed and can then be replaced by a fresh tip portion.

The casing 1 may be made in any suitable way without departing from the invention. As herein shown it is formed in two parts, a body portion 23 and a face plate 24. The body portion has the recesses 2 and 3 formed therein and the face plate 24 which is secured to the body 23 forms one side wall of said chambers.

When the apparatus is used as a motor with steam as the motive power it would be possible to connect up a plurality of devices so that the exhaust from one device would be taken into the inlet port of the next device. Where this arrangement is employed the various rotors may be all connected to the same shaft.

While I have illustrated herein some selected embodiments of my invention I do not wish to be limited to the constructional features shown.

I claim:

1. In a device of the class described, the combination with a casing having a plurality of circular chambers communicating with each other and also having inlet and outlet ports leading to said chambers, a rotor in each chamber, each rotor having gear teeth thereon which mesh with gear teeth on the other rotor, said gear teeth forming the sole driving connection between the rotors, each rotor also having blades extending peripherally therefrom beyond the gear teeth and engaging the walls of the corresponding chamber and also having recesses to freely receive the blades of the other rotor, each blade occupying the space of a single gear tooth only, whereby several of the gear teeth will be in mesh in all positions of the rotors.

2. In a device of the class described, the combination with a casing having a plurality of circular chambers communicating with each other and also having inlet and outlet ports leading to said chambers, a rotor in each chamber, each rotor having gear teeth thereon which mesh with gear teeth on rotor, said gear teeth forming the sole driving connection between the rotors, each rotor also having removable blades extending peripherally therefrom beyond the gear teeth and engaging the walls of the corresponding chamber and also having recesses to freely receive the blades of the other rotor, each blade occupying the space of a single gear tooth only, whereby several of the gear teeth will be in mesh in all positions of the rotors, each blade having a stem which is removably received in a recess formed in the rotor and the body of each blade being of a shape to fit and to engage the side faces of the adjacent gear teeth.

In testimony whereof, I have signed my name to this specification.

ARTHUR W. WEEDEN.

CERTIFICATE OF CORRECTION.

Patent No. 1,666,321.   Granted April 17, 1928, to

ARTHUR W. WEEDEN.

It is hereby certified that error appears in the printed specification of the above numbered patent requiring correction as follows: Page 3, line 29, claim 2, after the word "on" insert the words "the other"; and that the said Letters Patent should be read with this correction therein that the same may conform to the record of the case in the Patent Office.

Signed and sealed this 29th day of May, A. D. 1928.

(Seal)                M. J. Moore,
Acting Commissioner of Patents.

While I have illustrated herein some selected embodiments of my invention I do not wish to be limited to the constructional features shown.

I claim:

1. In a device of the class described, the combination with a casing having a plurality of circular chambers communicating with each other and also having inlet and outlet ports leading to said chambers, a rotor in each chamber, each rotor having gear teeth thereon which mesh with gear teeth on the other rotor, said gear teeth forming the sole driving connection between the rotors, each rotor also having blades extending peripherally therefrom beyond the gear teeth and engaging the walls of the corresponding chamber and also having recesses to freely receive the blades of the other rotor, each blade occupying the space of a single gear tooth only, whereby several of the gear teeth will be in mesh in all positions of the rotors.

2. In a device of the class described, the combination with a casing having a plurality of circular chambers communicating with each other and also having inlet and outlet ports leading to said chambers, a rotor in each chamber, each rotor having gear teeth thereon which mesh with gear teeth on rotor, said gear teeth forming the sole driving connection between the rotors, each rotor also having removable blades extending peripherally therefrom beyond the gear teeth and engaging the walls of the corresponding chamber and also having recesses to freely receive the blades of the other rotor, each blade occupying the space of a single gear tooth only, whereby several of the gear teeth will be in mesh in all positions of the rotors, each blade having a stem which is removably received in a recess formed in the rotor and the body of each blade being of a shape to fit and to engage the side faces of the adjacent gear teeth.

In testimony whereof, I have signed my name to this specification.

ARTHUR W. WEEDEN.

CERTIFICATE OF CORRECTION.

Patent No. 1,666,321.  Granted April 17, 1928, to

ARTHUR W. WEEDEN.

It is hereby certified that error appears in the printed specification of the above numbered patent requiring correction as follows: Page 3, line 29, claim 2, after the word "on" insert the words "the other"; and that the said Letters Patent should be read with this correction therein that the same may conform to the record of the case in the Patent Office.

Signed and sealed this 29th day of May, A. D. 1928.

(Seal)

M. J. Moore,
Acting Commissioner of Patents.